United States Patent
Zhou et al.

(10) Patent No.: US 12,047,313 B2
(45) Date of Patent: Jul. 23, 2024

(54) REFERENCE SIGNAL GROUPING FOR FULL-DUPLEX OPERATION

(71) Applicant: QUALCOMM Incorporated, San Diego, CA (US)

(72) Inventors: Yan Zhou, San Diego, CA (US); Kiran Venugopal, Raritan, NJ (US); Qian Zhang, Basking Ridge, NJ (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 17/303,449

(22) Filed: May 28, 2021

(65) Prior Publication Data

US 2021/0376977 A1    Dec. 2, 2021

Related U.S. Application Data

(60) Provisional application No. 63/032,906, filed on Jun. 1, 2020.

(51) Int. Cl.
*H04L 5/00* (2006.01)
*H04B 7/06* (2006.01)
*H04L 5/14* (2006.01)

(52) U.S. Cl.
CPC .......... *H04L 5/0048* (2013.01); *H04B 7/0695* (2013.01); *H04L 5/14* (2013.01)

(58) Field of Classification Search
CPC ....... H04L 5/0048; H04L 5/14; H04L 5/0053; H04L 5/0094; H04L 5/0023; H04L 5/0055; H04W 72/042; H04B 7/0695
See application file for complete search history.

(56) References Cited

U.S. PATENT DOCUMENTS

| | | | |
|---|---|---|---|
| 2015/0116155 A1* | 4/2015 | Chibane | H01Q 3/08 342/372 |
| 2016/0099802 A1* | 4/2016 | Noh | H04L 5/0053 370/277 |
| 2017/0141886 A1* | 5/2017 | Chung | H04L 1/0003 |

(Continued)

FOREIGN PATENT DOCUMENTS

WO    2012112281 A2    8/2012

OTHER PUBLICATIONS

Cewit, et al., "On Multi-Antenna Schemes for New Radio", 3GPP TSG RAN WG1 Meeting #86, 3GPP Draft, R1-167822, vol. RAN WG1, No. Gothenburg, Sweden, Aug. 22, 2016-Aug. 26, 2016, 3 Pages, Aug. 21, 2016 (Aug. 21, 2016), XP051140822, Retrieved from the Internet: URL: http://www.3gpp.org/ftp/Meetings_3GPP_SYNC/RAN1/Docs/ [retrieved on Aug. 21, 2016] Sections 1-6.

(Continued)

*Primary Examiner* — Ian N Moore
*Assistant Examiner* — Sun Jong Kim
(74) *Attorney, Agent, or Firm* — Harrity & Harrity, LLP

(57) ABSTRACT

The present disclosure generally relates to wireless communication. A user equipment may receive information indicating whether a reference signal is associated with a full-duplex operation; receive the reference signal; and transmit feedback based at least in part on the reference signal and the information indicating whether the reference signal is associated with the full duplex operation.

31 Claims, 9 Drawing Sheets

(56) References Cited

U.S. PATENT DOCUMENTS

| | | | | |
|---|---|---|---|---|
| 2018/0083679 | A1* | 3/2018 | Lim | H04B 17/336 |
| 2018/0249453 | A1* | 8/2018 | Nagaraja | H04B 7/0617 |
| 2019/0013857 | A1* | 1/2019 | Zhang | H04W 74/04 |
| 2020/0091978 | A1* | 3/2020 | Noh | H04B 7/0617 |
| 2020/0322032 | A1* | 10/2020 | Xiang | H04B 7/088 |
| 2020/0344031 | A1* | 10/2020 | Shao | H04W 72/10 |
| 2020/0373988 | A1* | 11/2020 | Wang | H04L 1/06 |
| 2022/0060221 | A1* | 2/2022 | Ko | H04L 5/0051 |
| 2022/0279450 | A1* | 9/2022 | Zhang | H04W 52/367 |

OTHER PUBLICATIONS

International Search Report and Written Opinion—PCT/US2021/070648—ISA/EPO—Sep. 24, 2021.

* cited by examiner

REFERENCE SIGNAL GROUPING FOR FULL-DUPLEX OPERATION

CROSS-REFERENCE TO RELATED APPLICATION

This Patent Application claims priority to U.S. Provisional Patent Application No. 63/032,906, filed on Jun. 1, 2020, entitled "REFERENCE SIGNAL GROUPING FOR FULL-DUPLEX OPERATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for reference signal (RS) grouping for a full-duplex operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include receiving information indicating whether a reference signal is associated with a full-duplex operation; receiving the reference signal; and transmitting feedback based at least in part on the reference signal and the information indicating whether the reference signal is associated with the full-duplex operation.

In some aspects, a method of wireless communication, performed by a base station, may include transmitting information indicating whether a reference signal is associated with a full-duplex operation; transmitting the reference signal; and receiving, from a user equipment (UE), feedback based at least in part on the reference signal and the information indicating whether the reference signal is associated with the full-duplex operation.

In some aspects, a user equipment for wireless communication may include a memory and one or more processors coupled to the memory. The one or more processors may be configured to receive information indicating whether a reference signal is associated with a full-duplex operation; receive the reference signal; and transmit feedback based at least in part on the reference signal and the information indicating whether the reference signal is associated with the full-duplex operation.

In some aspects, a base station for wireless communication may include a memory and one or more processors coupled to the memory. The one or more processors may be configured to transmit information indicating whether a reference signal is associated with a full-duplex operation; transmit the reference signal; and receive, from a UE, feedback based at least in part on the reference signal and the information indicating whether the reference signal is associated with the full-duplex operation.

In some aspects, a non-transitory computer-readable medium may store one or more instructions for wireless communication. The one or more instructions, when executed by one or more processors of a UE, may cause the one or more processors to receive information indicating whether a reference signal is associated with a full-duplex operation; receive the reference signal; and transmit feedback based at least in part on the reference signal and the information indicating whether the reference signal is associated with the full-duplex operation.

In some aspects, a non-transitory computer-readable medium may store one or more instructions for wireless communication. The one or more instructions, when executed by one or more processors of a base station, may cause the one or more processors to transmit information indicating whether a reference signal is associated with a full-duplex operation; transmit the reference signal; and receive, from a UE, feedback based at least in part on the reference signal and the information indicating whether the reference signal is associated with the full-duplex operation.

In some aspects, an apparatus for wireless communication may include means for receiving information indicating whether a reference signal is associated with a full-duplex operation; means for receiving the reference signal; and means for transmitting feedback based at least in part on the reference signal and the information indicating whether the reference signal is associated with the full-duplex operation.

In some aspects, an apparatus for wireless communication may include means for transmitting information indicating whether a reference signal is associated with a full-duplex operation; means for transmitting the reference signal; and means for receiving, from a UE, feedback based at least in part on the reference signal and the information indicating whether the reference signal is associated with the full-duplex operation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
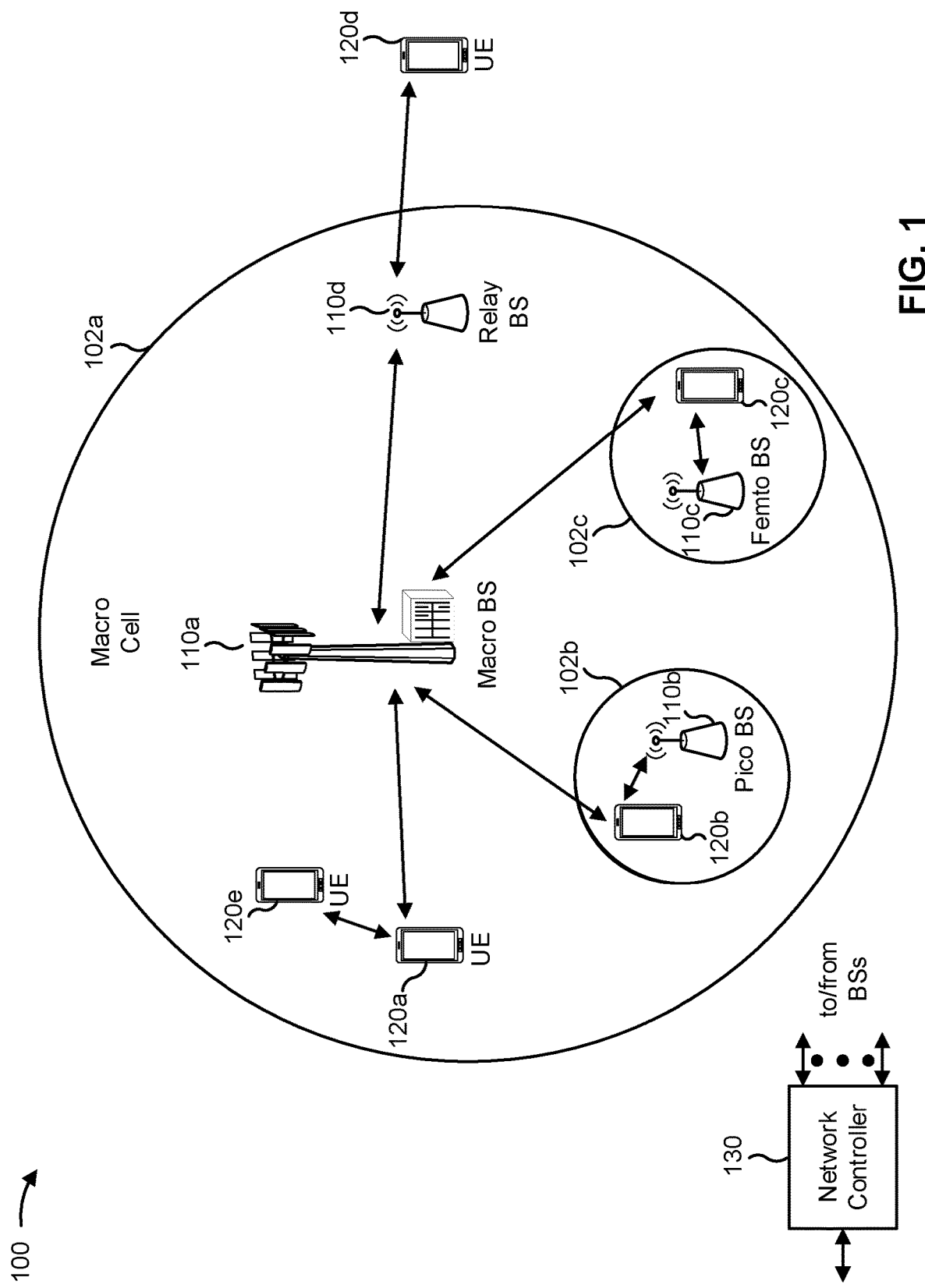
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
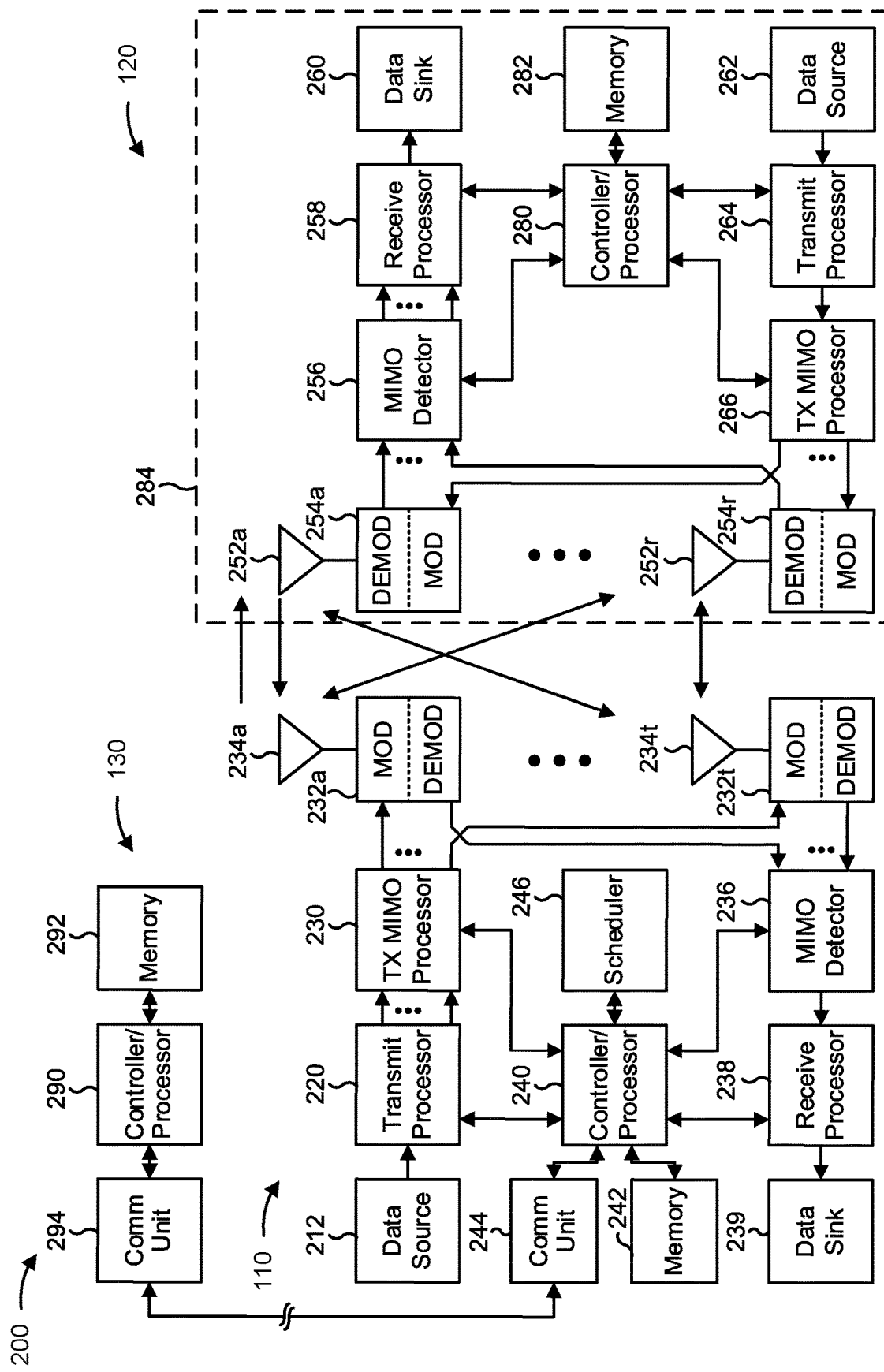
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-9.

Controller/processor 240 of base station 110, controller/processor 280 of UE 120, and/or any other component(s) of FIG. 2 may perform one or more techniques associated with reference signal (RS) grouping for a full-duplex operation, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 may include means for receiving information indicating whether a reference signal is associated with a full-duplex operation; means for receiving the reference signal; means for transmitting feedback based at least in part on the reference signal and the information indicating whether the reference signal is associated with the full-duplex operation; means for receiving a set of reference signals on a respective set of beams; means for determining that the set of beams are suitable for full-duplex communication by the UE; means for transmitting information indicating a set of reference signal identifiers corresponding to the set of beams being suitable for full-duplex communication by the UE; means for receiving information indicating a set of reference signal identifiers associated with a set of reference signals transmitted using a second set of transmit beams, wherein a beam from the first set of transmit beams and a beam from the second set of transmit beams can be used jointly for the full-duplex operation; means for selecting another beam, associated with a receive-only condition or a transmit/receive condition, for the full-duplex operation; means for selecting another beam, associated with a transmit-only condition or a transmit/receive condition, for the full-duplex operation; means for selecting another beam, associated with a transmit-only condition, a receive-only condition, or a transmit/receive condition, for the full-duplex operation; means for determining whether a receive beam corresponding to the reference signal is associated with a transmit-only condition, a receive-only condition, or a transmit/receive condition, wherein the feedback indicates whether the receive beam is associated with the transmit-only condition, the receive-only condition, or the transmit/receive condition, and wherein the feedback is based at least in part on the determination; means for determining whether a receive beam corresponding to the reference signal is associated with a transmit/receive condition, wherein the feedback indicates whether the receive beam is associated with the transmit/receive condition; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting information indicating whether a reference signal is associated with a full-duplex operation; means for transmitting the reference signal; means for receiving, from a UE, feedback based at least in part on the reference signal and the information indicating whether the reference signal is associated with the full-duplex operation; means for transmitting a set of reference signals on a respective set of beams; means for receiving information indicating a set of reference signal identifiers corresponding to the set of reference signals based at least in part on the set of beams being suitable for full-duplex communication by the UE; means for transmitting information indicating a set of reference signal identifiers for a set of reference signals transmitted using a second set of transmit beams, wherein a beam from the first set of transmit beams and a beam from the second set of transmit beams can be used jointly for the full-duplex operation; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
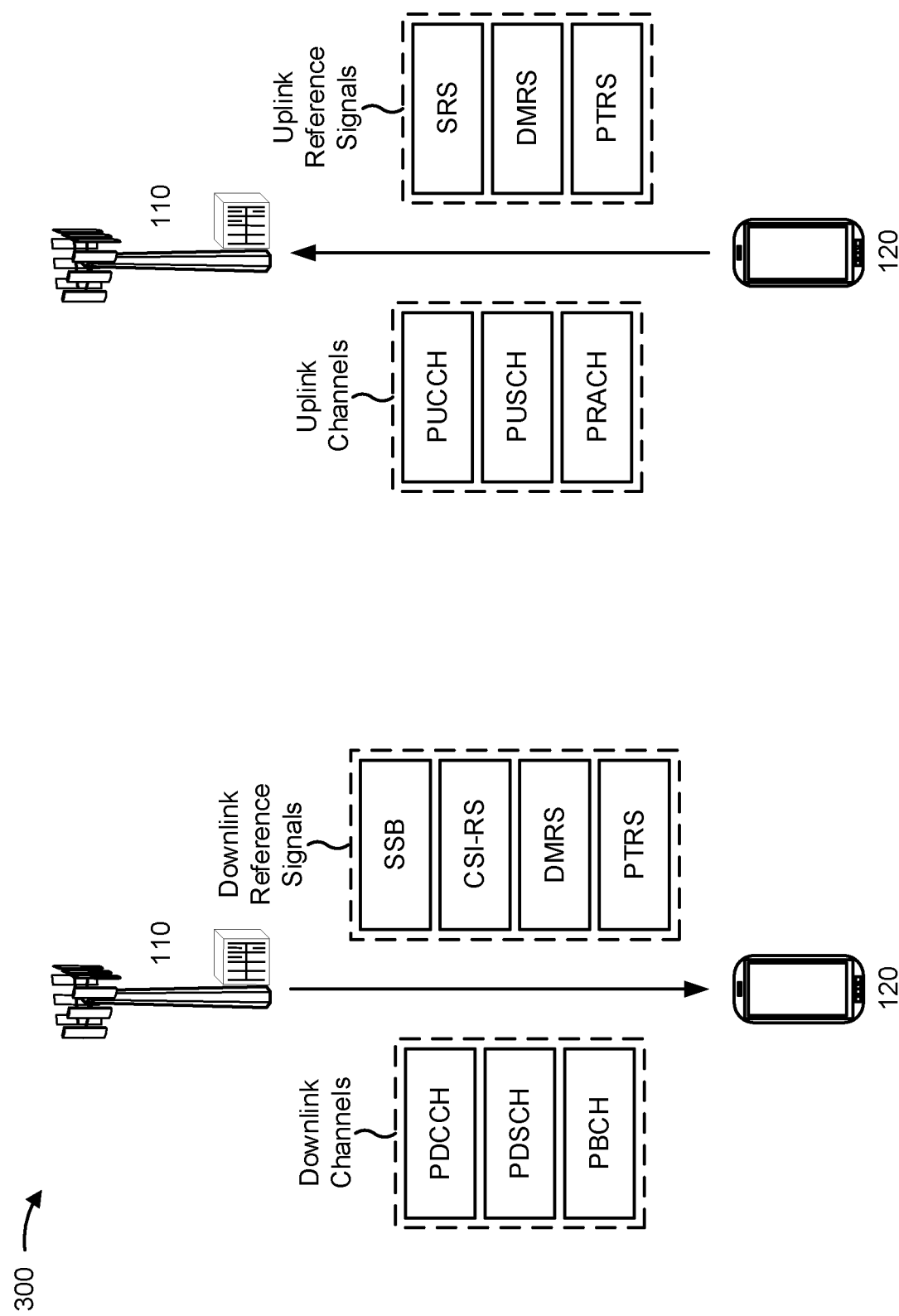
FIG. 3 is a diagram illustrating an example of physical channels and reference signals (RSs) in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may be transmitted from a base station 110 to a UE 120, and uplink channels and uplink reference signals may be transmitted from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRSs can be utilized at high carrier frequencies, such as millimeter wave frequencies, to mitigate phase noise. The PTRS may be used to track the phase of the local oscillator and to enable suppression of phase noise and common phase error. As shown, PTRSs are used for both downlink communications (e.g., on the PDSCH) and uplink communications (e.g., on the PUSCH).

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
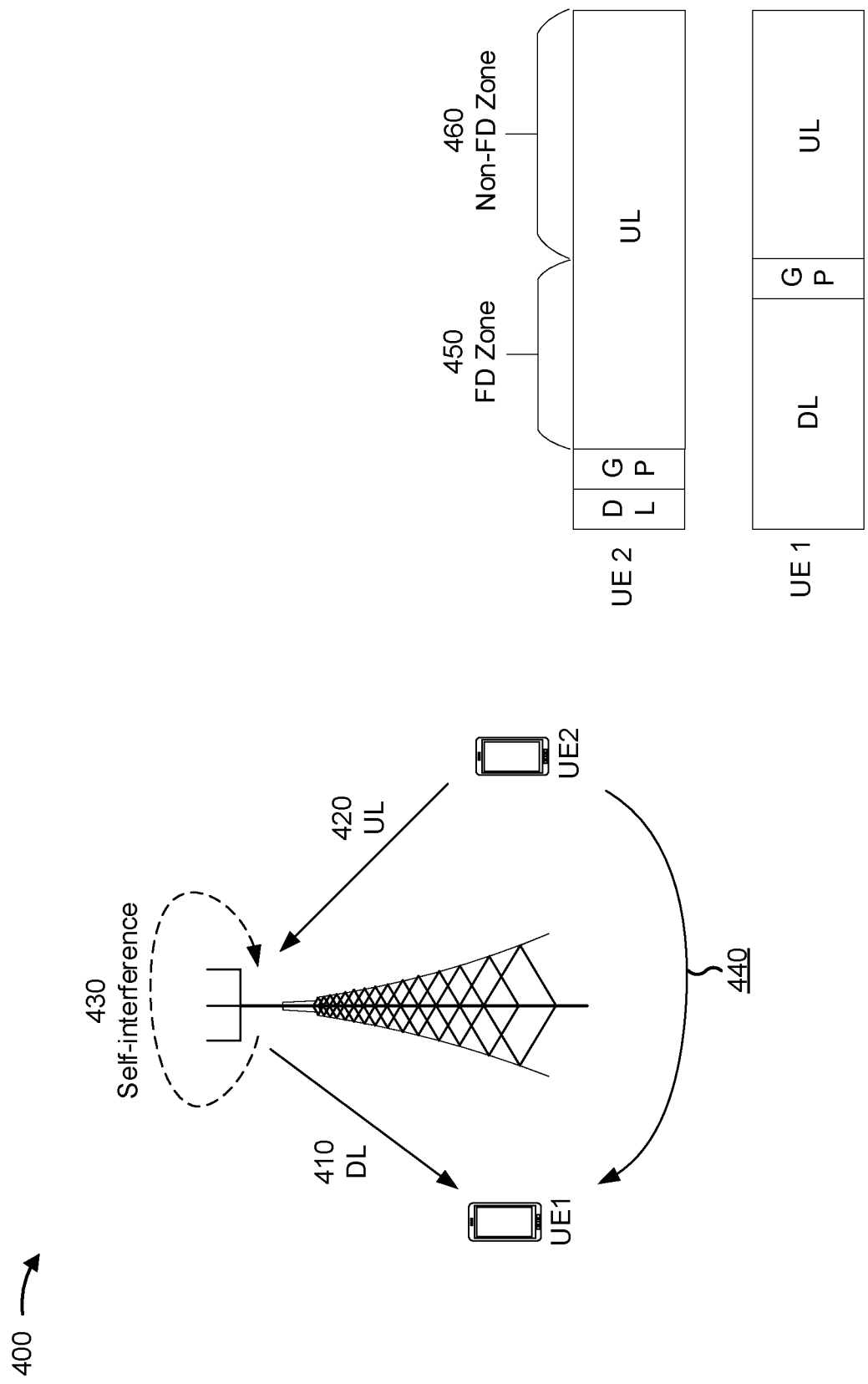
FIG. 4 is a diagram illustrating an example of a full duplex (FD) zone, a non-FD zone, and self-interference associated with FD communications, in accordance with the present disclosure.

FIG. 4 is a diagram illustrating an example 400 of a full duplex (FD) zone, a non-FD zone, and self-interference associated with FD communications, in accordance with the present disclosure. As shown, example 400 includes a BS (e.g., BS 110 and/or the like), a UE1 (e.g., UE 120 and/or the like), and a UE2 (e.g., UE 120 and/or the like). In some aspects, the BS may be capable of FD communication. FD communication may include contemporaneous uplink and downlink communications using the same resources. For example, the BS may perform a downlink (DL) transmission to a UE1 (shown by reference number 410) and may receive an uplink (UL) transmission from a UE2 (shown by reference number 420) using the same frequency resources and at least partially overlapping in time.

As shown by reference number 430, the DL transmission from the BS may self-interfere with the UL transmission to the BS. This may be caused by a variety of factors, such as the higher transmit power for the DL transmission (as compared to the UL transmission), radio frequency bleeding, and/or the like. Furthermore, as shown by reference number 440, the UL transmission to the BS from the UE2 may interfere with the DL transmission from the BS to the UE1, thereby diminishing DL performance of the UE1.

An FD zone is shown by reference number 450 and a non-FD zone is shown by reference number 460. "FD zone" may refer to a time period and/or a frequency region in which a wireless communication device (e.g., a BS 110, a UE 120, a node, a wireless communication device, and/or the like) performs FD communication, and "non-FD zone" may refer to a time period and/or a frequency region in which a wireless communication device performs non-FD (e.g., half-duplex) communication. The FD zone may be associated with higher self-interference, and therefore a lower signal-to-interference-plus-noise ratio (SINR), than the non-FD zone. In some cases, flexible time division duplexing (TDD) may be used to enable FD communication. For example, the configuration of uplink transmissions and downlink receptions (e.g., antenna panels used for such uplink transmissions and downlink receptions, respective proportions of downlink and uplink traffic, downlink-only or uplink-only operation, and/or the like) may vary over time.

As indicated above, FIG. 4 is provided as an example. Other examples may differ from what is described with respect to FIG. 4.

A base station may transmit reference signals using different transmit beams to facilitate beam selection, reselection, and/or the like by a UE. For example, the UE may perform measurements on the reference signals (e.g., a Layer 1 reference signal received power (L1-RSRP) measurement, an L1 signal to interference plus noise ratio (L1-SINR) measurement, and/or the like). The UE may select one or more beams for communication with the base station, and may report information indicating the one or more selected beams. For example, the UE may select a set of beams associated with a highest measurement value, and may report reference signal identifiers corresponding to reference signals transmitted on the set of beams.

In some aspects, a UE may select beams for FD operation. For example, the UE may select one downlink beam for downlink reception (i.e., a receive beam), and may select another downlink beam for uplink transmission concurrently with the downlink reception (i.e., a transmit beam). Communication in FD by a UE or a base station may be referred to as an FD operation. However, not all downlink beams carrying a reference signal are suitable for FD communication. For example, if the UE were to select a first beam and a second beam that are transmitted by a same antenna panel of the base station, then the base station may not be able to achieve spatial diversity for the first beam and the second beam, thereby rendering FD communication impractical or sub-optimal due to self-interference at the base station. As another example, two reported reference signals may be associated with one or more UE receive beams that cannot be used for FD communication, for example, due to the two reference signals being associated with the same UE receive beam, different UE receive beams on the same antenna panel, or UE receive beams that cannot be used for uplink transmission by the UE. As a third example, the UE may select and report a first beam and a second beam that cannot be used by the base station for reception, meaning that FD communication cannot be performed using only the first beam and the second beam. The selection of beams that are incompatible with FD communication may waste time and resources associated with beam selection and reporting, and may cause interruption of traffic to be communicated as part of the FD communication.

Some techniques and apparatuses described herein provide indication of reference signal groupings based at least in part on an FD capability of a transmitter of the reference signals. For example, the transmitter may provide information indicating that a set of reference signals are to be used for beam selection for an FD operation, thus enabling the UE to select reference signals on beams that are compatible with FD operation by the UE. As another example, the transmitter may provide information indicating reference signals transmitted on a set of beams that can be jointly used for an FD operation (e.g., any pair of beams selected from the set of beams are suitable for the FD operation). As yet another example, the transmitter may provide information indicating reference signals transmitted on a set of beams that cannot be jointly used for an FD operation. In such a case, beams corresponding to different sets of beams can be used for an FD operation. As still another example, the transmitter may provide information indicating whether a beam used to transmit a reference signal is capable of being used or is preferred to be used as a receive-only beam, a transmit-only beam, or a transmit and/or receive (transmit/receive) beam. Some techniques and apparatuses described herein provide for a UE to indicate whether a receive beam, associated with a reported reference signal identifier, is capable of being used or is preferred to be used as a receive-only beam, a transmit-only beam, or a transmit or receive (transmit/receive) beam.

By providing information indicating whether beams can be used for an FD operation, the transmitter (e.g., the base station) facilitates selection, by the UE, of beams for the FD operation. Thus, the efficiency and accuracy of selection of beams for the FD operation is improved, thereby increasing throughput and reducing interference and traffic interruption at the UE and the transmitter.

Figure 5:
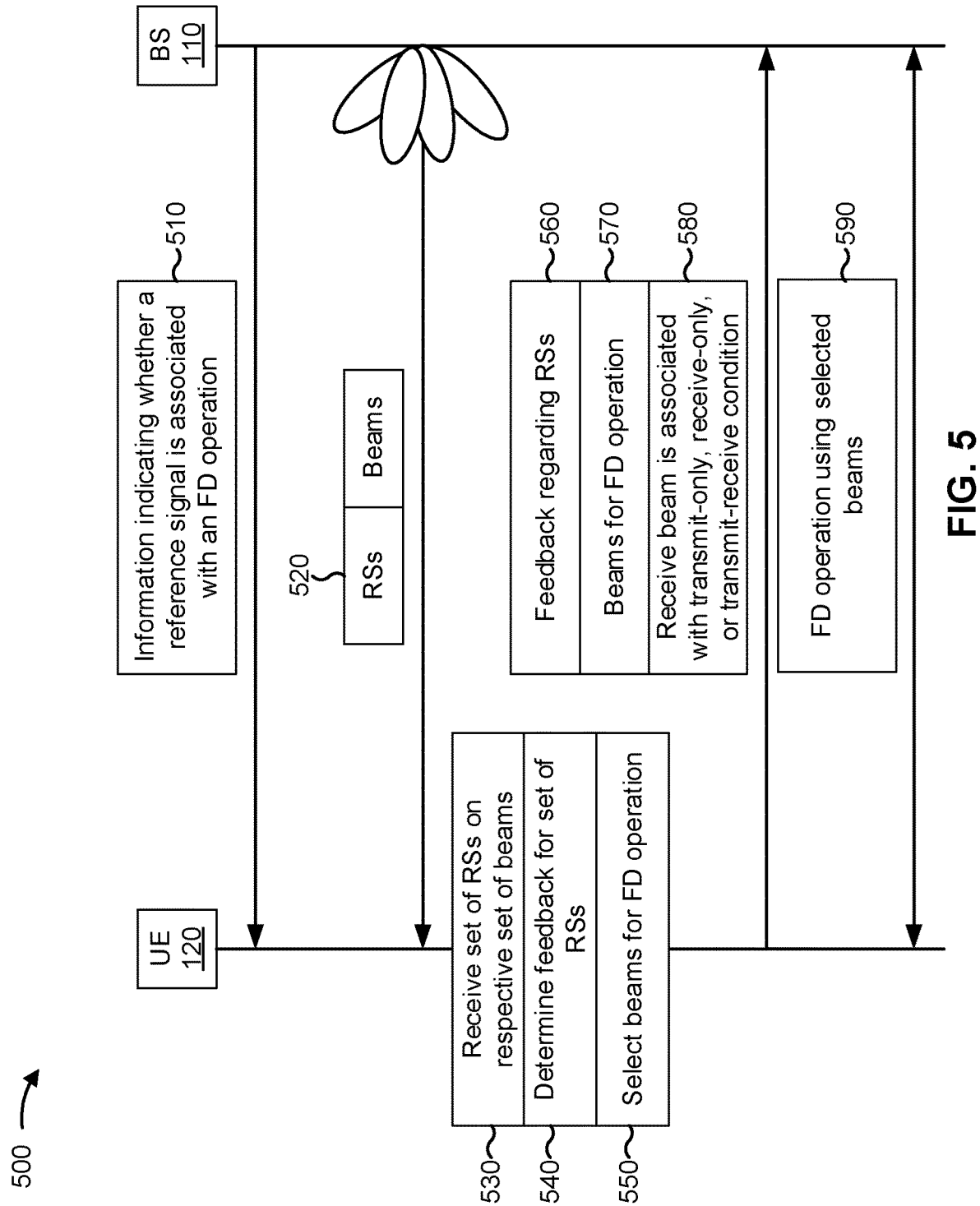
FIG. 5 is a diagram illustrating an example associated with reference signal grouping for an FD operation, in accordance with the present disclosure.

FIG. 5 is a diagram illustrating an example 500 associated with reference signal grouping for an FD operation, in accordance with the present disclosure. As shown in FIG. 5, a base station 110 and a UE 120 may communicate with one another. In example 500, the base station may be considered a transmitter, since the base station transmits a set of reference signals on a respective set of beams. However, the techniques described with regard to example 500 can be applied for any transmitter that is capable of transmitting a reference signal, such as another UE in a sidelink operation.

As show, the BS 110 may transmit, and the UE 120 may receive, information 510 indicating whether an RS is associated with an FD operation. For example, the information 510 may indicate whether a transmit beam used by the BS 110 to transmit the reference signal can be selected by the UE 120 for an FD operation. In some aspects, the BS 110 may transmit the information 510 for a plurality of RSs to be transmitted on respective beams. Thus, the UE 120 can select multiple beams for an FD operation based at least in part on the information 510.

In some aspects, the BS 110 may provide the information 510 in an RS resource configuration (also referred to as a reference signal configuration) for a plurality of RSs, such as a CSI-ResourceConfig configuration. In other aspects, the BS 110 may provide the information 510 in a configuration specific to an RS (e.g., an individual RS resource configuration), such as a non-zero-power channel state information reference signal (NZP-CSI-RS) resource configuration.

In some aspects, the information 510 may indicate that the purpose of an RS is for FD beam selection. For example, the information 510 may indicate that a beam used to transmit the RS can be used by the BS 110 for an FD operation (e.g., that the beam can be used as a transmit beam at the BS 110 and a receive beam at the BS 110). In this case, the information 510 may be configured in an RS resource configuration for a plurality of RSs that can be used or selected for the FD operation (e.g., a CSI-ResourceConfig and/or the like).

Figure 6:
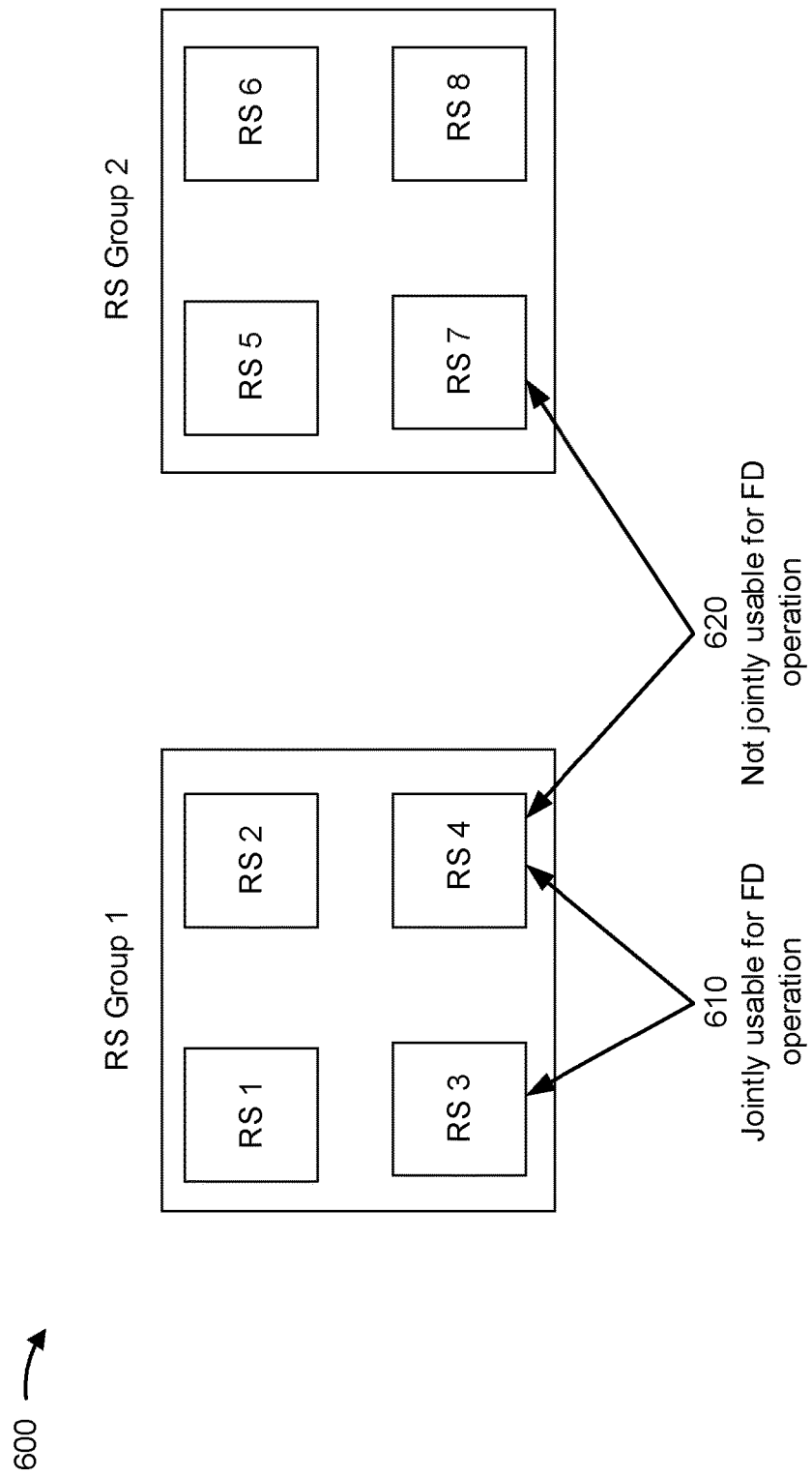
FIG. 6 is a diagram illustrating an example of RS groups for FD beam selection, in accordance with the present disclosure.

In some aspects, the information 510 may indicate a set of RSs (e.g., a group of RSs) from which multiple beams can be selected for an FD operation. For example, the information 510 may indicate a set of two or more RSs, and all subsets of RSs, of the two or more RSs, may be transmitted on beams that can be used for FD operation by the BS 110. FIG. 6 is a diagram illustrating an example 600 of RS groups for FD beam selection, in accordance with the present disclosure. As shown, example 600 includes an RS group 1 comprising RSs 1, 2, 3, and 4, and an RS group 2 comprising RSs 5, 6, 7, and 8. Any subset of the RSs configured in RS group 1 (e.g., RS 1 and RS 2, RS 1 and RS 3, RS 1 and RS 4, RS 2 and RS 3, RS 2 and RS 4, or RS 3 and RS 4, as shown by reference number 610), can be used for FD operation by the BS 110, and any subset of the RSs configured in RS group 2 can be used for FD operation by the BS 110. For example, the RSs of an RS group may be transmitted using beams associated with different TRPs or different antenna panels such that any pair of the RSs of the RS group can be selected for the FD operation. The RS groups may be indicated as part of an RS resource configuration for an RS group.

In some aspects, RSs selected from different RS groups may not be usable for FD operation (e.g., may not be guaranteed to be usable for the FD operation), as shown by reference number 620. For example, RSs selected from different RS groups may be associated with a same TRP, a same antenna panel, a same transmit beam at the BS 110, and/or the like, which may render the RSs impractical for FD operation.

Figure 7:
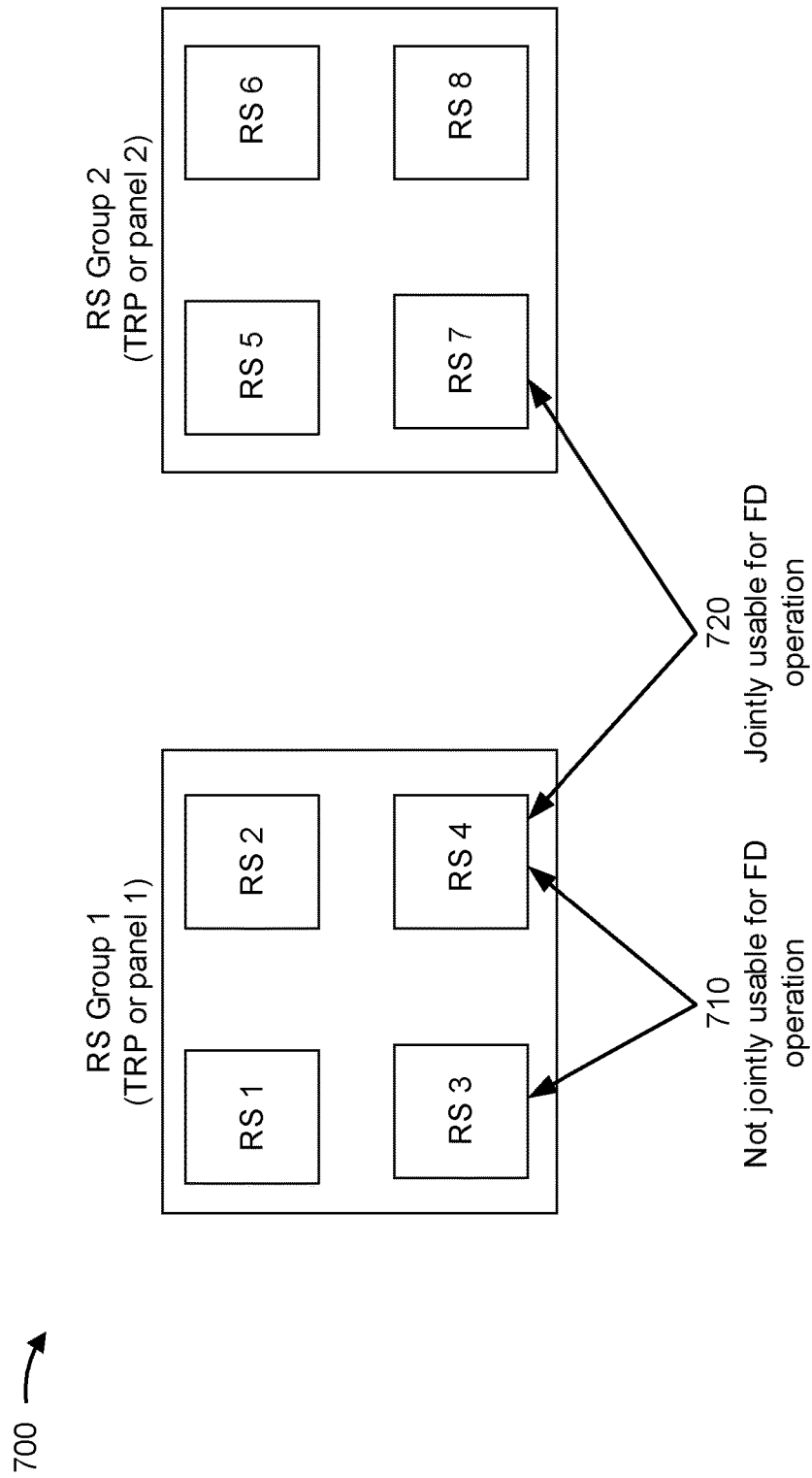
FIG. 7 is a diagram illustrating an example of RS groups for FD beam selection, in accordance with the present disclosure.

In some aspects, the information 510 may indicate sets of RSs (e.g., groups of RSs), and beams may be selectable from different sets of RSs for FD operation. For example, the information 510 may indicate two or more sets of one or more RSs. A beam selected from a first set of RSs and a beam selected from the second set of RSs may be usable for FD operation, whereas two beams selected from a single set of RSs may not be usable for FD operation. FIG. 7 is a diagram illustrating an example 700 of RS groups for FD beam selection, in accordance with the present disclosure. As shown, example 700 includes an RS group 1 comprising RSs 1, 2, 3, and 4, and an RS group 2 comprising RSs 5, 6, 7, and 8. Subsets of the RSs configured in RS group 1 may or may not be usable for FD operation by the BS 110, and subsets of the RSs configured in RS group 2 may or may not be usable for FD operation by the BS 110, as shown by reference number 710. For example, the RSs of an RS group may be transmitted using beams associated with a same TRP or a same antenna panel such that the RSs of the RS group may not be suitable for the FD operation. As shown by reference number 720, RSs selected from different RS groups may be usable for an FD operation. For example, the FD groups may be configured such that RSs from different FD groups are associated with different TRPs or different antenna panels, and are therefore selectable for FD operation.

In some aspects, the information 510 may indicate whether a beam used to transmit an RS is associated with a receive-only condition, a transmit-only condition, or a transmit or receive (transmit/receive) condition. A receive-only condition may indicate that a transmit beam used to transmit an RS is capable only of receiving data communications or is preferred to be used for receiving data communications. A transmit-only condition may indicate that a transmit beam used to transmit an RS is capable only of transmitting data communications or control communications, or is preferred to be used for transmitting data communications or control communications. A transmit/receive condition may indicate that a transmit beam used to transmit an RS is capable of receiving and transmitting data communications or control communications. The UE 120 may select a set of beams for an FD operation based at least in part on whether the set of beams are associated with the receive-only condition, the transmit-only condition, or the transmit/receive condition. For example, the UE 120 may select a pair of beams that are both associated with the transmit/receive condition, a first beam associated with the transmit-only condition and a second beam associated with the receive-only condition, and/or the like. For an RS whose transmit beam is associated with a transmit-only condition, the UE 120 may select a corresponding UE beam that is at least capable of reception (e.g., a UE beam associated with a receive-only condition or a transmit/receive condition). For an RS whose transmit beam is associated with a receive-only condition, the UE 120 may select a corresponding UE beam that is at least capable of transmission (e.g., a UE beam associated with a transmit-only condition or a transmit/receive condition). For an RS whose transmit beam is associated with a transmit/receive condition, the UE 120 may select a corresponding UE beam associated with a receive-only condition, a transmit-only condition, or a transmit/receive condition.

Returning to FIG. 5, as shown by reference number 520, the BS 110 may transmit a plurality of RSs. For example, the BS 110 may transmit the plurality of RSs on respective beams. An RS may include, for example, a CSI-RS, an SSB, a positioning reference signal (PRS), a combination thereof, and/or the like. As shown by reference number 530, the UE 120 may receive the plurality of RSs on a respective set of beams. For example, the UE 120 may generate receive beams, and may receive the plurality of RSs on the generated receive beams.

As shown by reference number 540, the UE 120 may determine feedback for the plurality of RSs. In some aspects, the feedback may indicate measurements for the plurality of RSs, such as L1-RSRP measurements, L1-SINR measurements, and/or the like. In some aspects, the feedback may indicate one or more selected beams. For example, the UE 120 may select a set of beams based at least in part on measurements performed on the set of beams. In some aspects, as shown by reference number 550, the UE 120 may select the set of beams for FD operation. For example, the UE 120 may select the set of beams based at least in part on measurements on RSs corresponding to the set of beams. In some aspects, the UE 120 may select the set of beams based at least in part on the RS groups described with regard to FIGS. 6 and 7.

As shown by reference number 560, the UE 120 may transmit, and the BS 110 may receive, feedback regarding the plurality of RSs transmitted by the BS 110. For example, the UE 120 may transmit information indicating a set of RSs selected based at least in part on measurements on the set of RSs, a set of RSs selected for FD operation based at least in part on the information 510 (as shown by reference number 570), and/or the like.

In some aspects, as shown by reference number 580, the feedback may include or be associated with information indicating whether a receive beam, used by the UE 120 to receive an RS associated with the feedback, is associated with a transmit-only condition, a receive-only condition, or a transmit-receive condition. A receive-only condition may indicate that a receive beam used to receive an RS is capable of receiving data communications or control communications or is preferred to be used for receiving data communications or control communications. A transmit-only condition may indicate that a receive beam used to receive an RS is capable only of transmitting control communications, or is preferred to be used for transmitting control communications. A transmit/receive condition may indicate that a receive beam used to receive an RS is capable of receiving and transmitting data communications or control communications. In some aspects, the feedback shown by reference number 580 may indicate whether a receive beam is associated with a transmit/receive condition, a receive-only condition, or a transmit-receive condition, based at least in part on an RS received via the receive beam being associated with a transmit/receive condition.

As shown by reference number 590, the UE 120 and the BS 110 may communicate using the selected beams shown by reference number 570. For example, the UE 120 and the BS 110 may perform the FD operation using the selected beams. In this case, the BS 110 may determine whether the selected beams indicated by the UE 120 in the feedback shown by reference number 560 are suitable for FD operation, and if so, may configure the selected beams for FD operation. Thus, the UE 120 and the BS 110 may select beams for FD operation based at least in part on reference signals shown by reference number 520 and information 510 indicating whether the reference signals shown by reference number 520 are suitable for FD operation. In this way, the likelihood of selection of unsuitable beams for FD operation is reduced, thereby improving throughput and reducing interruption of communications associated with improper beam selection.

As indicated above, FIGS. 5-7 are provided as one or more examples. Other examples may differ from what is described with respect to FIGS. 5-7.

Figure 8:
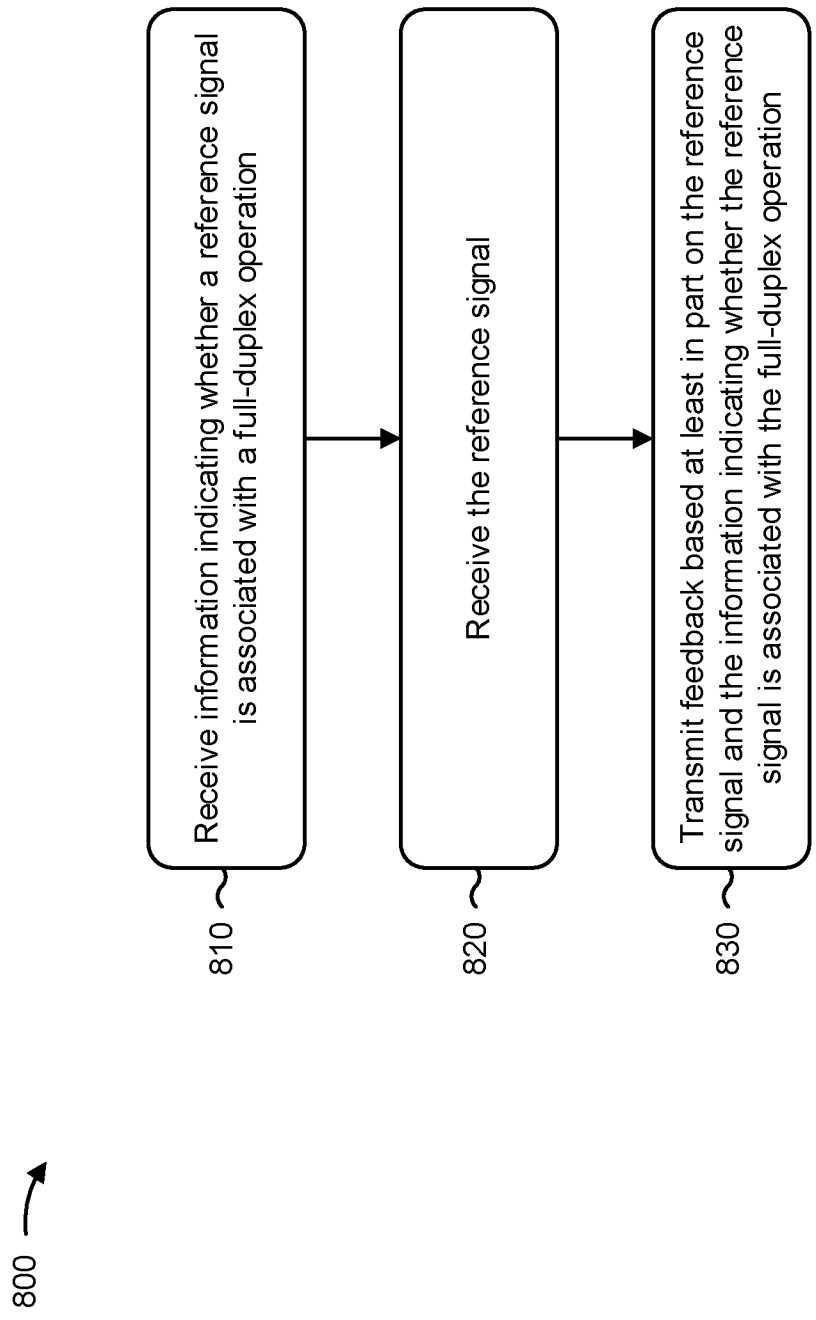
FIGS. 8 and 9 are diagrams illustrating example processes associated with RS grouping for a full-duplex operation, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with reference signal grouping for full-duplex operation.

As shown in FIG. 8, in some aspects, process 800 may include receiving information indicating whether a reference signal is associated with a full-duplex operation (block 810). For example, the UE (e.g., using antenna 252, DEMOD 254, MIMO detector 256, receive processor 258, controller/processor 280, and/or the like) may receive information indicating whether a reference signal is associated with a full-duplex operation, as described above.

As further shown in FIG. 8, in some aspects, process 800 may include receiving the reference signal (block 820). For example, the UE (e.g., using antenna 252, DEMOD 254, MIMO detector 256, receive processor 258, controller/processor 280, and/or the like) may receive the reference signal, as described above.

As further shown in FIG. 8, in some aspects, process 800 may include transmitting feedback based at least in part on the reference signal and the information indicating whether the reference signal is associated with the full-duplex operation (block 830). For example, the UE (e.g., using antenna 252, DEMOD 254, MIMO detector 256, receive processor 258, controller/processor 280, and/or the like) may transmit feedback based at least in part on the reference signal and the information indicating whether the reference signal is associated with the full-duplex operation, as described above.

Process 800 may include additional aspects, such as any single aspect or any combination of aspects described below and/or in connection with one or more other processes described elsewhere herein.

In a first aspect, the reference signal is transmitted on a beam, and the information indicating whether the reference signal is associated with the full-duplex operation indicates whether the beam is associated with the full-duplex operation.

In a second aspect, alone or in combination with the first aspect, the reference signal is at least one of a channel state information reference signal, a synchronization signal block, or a positioning reference signal.

In a third aspect, alone or in combination with one or more of the first and second aspects, the information indicating whether the reference signal is associated with the full-duplex operation indicates that the reference signal is for full-duplex beam selection.

In a fourth aspect, alone or in combination with one or more of the first through third aspects, process 800 includes receiving a set of reference signals on a respective set of beams; determining that the set of beams are suitable for full-duplex communication by the UE; and transmitting information indicating a set of reference signal identifiers corresponding to the set of reference signals based at least in part on the set of beams being suitable for full-duplex communication by the UE.

In a fifth aspect, alone or in combination with one or more of the first through fourth aspects, all subsets of beams of the set of beams are suitable for full-duplex communication by the UE.

In a sixth aspect, alone or in combination with one or more of the first through fifth aspects, the information indicating whether the reference signal is associated with the full-duplex operation is indicated in a reference signal configuration for the reference signal.

In a seventh aspect, alone or in combination with one or more of the first through sixth aspects, the information indicating whether the reference signal is associated with the full-duplex operation indicates a set of reference signals transmitted using a set of transmit beams that can be used for the full-duplex operation.

In an eighth aspect, alone or in combination with one or more of the first through seventh aspects, all subsets of beams of the set of transmit beams are suitable for full-duplex communication by a base station that transmits the set of reference signals.

In a ninth aspect, alone or in combination with one or more of the first through eighth aspects, the information indicating whether the reference signal is associated with the full-duplex operation is indicated in a reference signal configuration for the set of reference signals.

In a tenth aspect, alone or in combination with one or more of the first through ninth aspects, the information indicating whether the reference signal is associated with the full-duplex operation is indicated in reference signal configurations that are each specific to a respective reference signal of the set of reference signals.

In an eleventh aspect, alone or in combination with one or more of the first through tenth aspects, the information indicating whether the reference signal is associated with the full-duplex operation indicates a set of reference signals transmitted using a set of transmit beams that cannot be used jointly for the full-duplex operation.

In a twelfth aspect, alone or in combination with one or more of the first through eleventh aspects, the set of transmit beams are all associated with a same transmit-receive point or a same antenna panel.

In a thirteenth aspect, alone or in combination with one or more of the first through twelfth aspects, process 800 includes receiving information indicating a set of reference signal identifiers associated with a set of reference signals transmitted using a second set of transmit beams, wherein a beam from the first set of transmit beams and a beam from the second set of transmit beams can be used jointly for the full-duplex operation.

In a fourteenth aspect, alone or in combination with one or more of the first through thirteenth aspects, the information indicating whether the reference signal is associated with the full-duplex operation is indicated in a reference signal configuration for the set of reference signals.

In a fifteenth aspect, alone or in combination with one or more of the first through fourteenth aspects, the information indicating whether the reference signal is associated with the full-duplex operation is indicated in reference signal configurations that are specific to respective reference signals of the set of reference signals.

In a sixteenth aspect, alone or in combination with one or more of the first through fifteenth aspects, the information indicating whether the reference signal is associated with the full-duplex operation indicates whether a beam corresponding to the reference signal is associated with a transmit-only condition, a receive-only condition, or a transmit/receive condition.

In a seventeenth aspect, alone or in combination with one or more of the first through sixteenth aspects, process 800 includes selecting another beam, associated with a receive-only condition or a transmit/receive condition, for the full-duplex operation.

In an eighteenth aspect, alone or in combination with one or more of the first through seventeenth aspects, process 800 includes selecting another beam, associated with a transmit-only condition or a transmit/receive condition, for the full-duplex operation.

In a nineteenth aspect, alone or in combination with one or more of the first through eighteenth aspects, process 800 includes selecting another beam, associated with a transmit-only condition, a receive-only condition, or a transmit/receive condition, for the full-duplex operation.

In a twentieth aspect, alone or in combination with one or more of the first through nineteenth aspects, process 800 includes determining whether a receive beam corresponding to the reference signal is associated with a transmit-only condition, a receive-only condition, or a transmit/receive condition, wherein the feedback indicates whether the receive beam is associated with the transmit-only condition, the receive-only condition, or the transmit/receive condition, and wherein the feedback is based at least in part on the determination.

In a twenty-first aspect, alone or in combination with one or more of the first through twentieth aspects, process 800 includes determining whether a receive beam corresponding to the reference signal is associated with a transmit/receive condition, wherein the feedback indicates whether the receive beam is associated with the transmit/receive condition.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
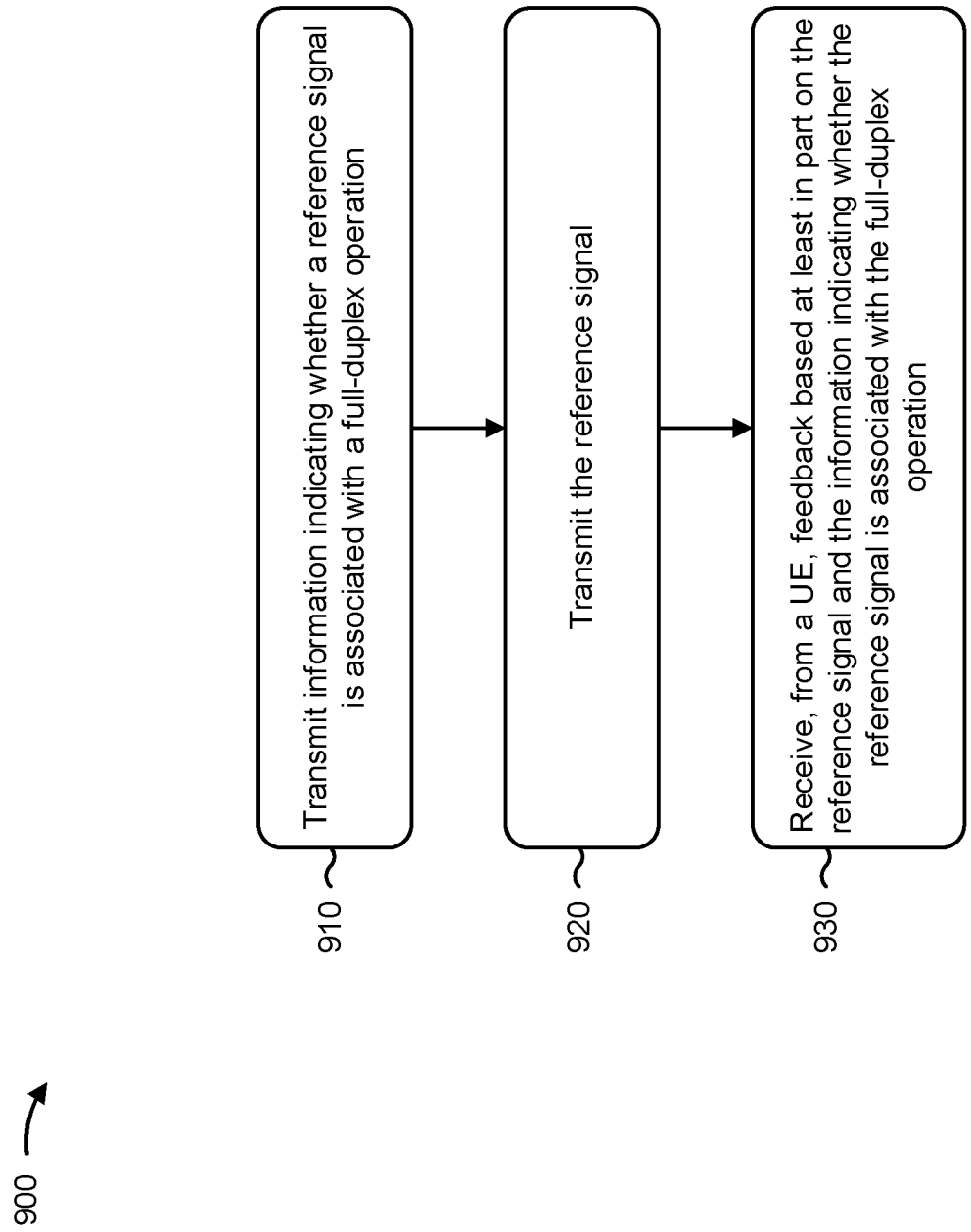

FIG. 9 is a diagram illustrating an example process 900 performed, for example, by a base station, in accordance with the present disclosure. Example process 900 is an example where the base station (e.g., base station 110 and/or the like) performs operations associated with reference signal grouping for full-duplex operation.

As shown in FIG. 9, in some aspects, process 900 may include transmitting information indicating whether a reference signal is associated with a full-duplex operation (block 910). For example, the base station (e.g., using controller/processor 240, transmit processor 220, TX MIMO processor 230, MOD 232, antenna 234, and/or the like) may transmit information indicating whether a reference signal is associated with a full-duplex operation, as described above.

As further shown in FIG. 9, in some aspects, process 900 may include transmitting the reference signal (block 920). For example, the base station (e.g., using controller/processor 240, transmit processor 220, TX MIMO processor 230, MOD 232, antenna 234, and/or the like) may transmit the reference signal, as described above. In some aspects, the base station may transmit a plurality of reference signals on respective beams. In some aspects, the base station may transmit a plurality of reference signals on one or more beams. For example, two or more reference signals may be transmitted on a same beam.

As further shown in FIG. 9, in some aspects, process 900 may include receiving, from a UE, feedback based at least in part on the reference signal and the information indicating whether the reference signal is associated with the full-duplex operation (block 930). For example, the base station (e.g., using antenna 234, DEMOD 232, MIMO detector 236, receive processor 238, controller/processor 240, and/or the like) may receive, from a UE, feedback based at least in part on the reference signal and the information indicating whether the reference signal is associated with the full-duplex operation, as described above.

Process 900 may include additional aspects, such as any single aspect or any combination of aspects described below and/or in connection with one or more other processes described elsewhere herein.

In a first aspect, the reference signal is transmitted on a beam, and the information indicating whether the reference signal is associated with the full-duplex operation indicates whether the beam is associated with the full-duplex operation.

In a second aspect, alone or in combination with the first aspect, the reference signal is at least one of a channel state information reference signal, a synchronization signal block, or a positioning reference signal.

In a third aspect, alone or in combination with one or more of the first and second aspects, the information indicating whether the reference signal is associated with the full-duplex operation indicates that the reference signal is for full-duplex beam selection.

In a fourth aspect, alone or in combination with one or more of the first through third aspects, process 900 includes transmitting a set of reference signals on a respective set of beams; and receiving information indicating a set of reference signal identifiers corresponding to the set of reference signals based at least in part on the set of beams being suitable for full-duplex communication by the UE.

In a fifth aspect, alone or in combination with one or more of the first through fourth aspects, all subsets of beams of the set of beams are suitable for full-duplex communication by the UE.

In a sixth aspect, alone or in combination with one or more of the first through fifth aspects, the information indicating whether the reference signal is associated with the full-duplex operation is indicated in a reference signal configuration for the reference signal.

In a seventh aspect, alone or in combination with one or more of the first through sixth aspects, the information indicating whether the reference signal is associated with the full-duplex operation indicates a set of reference signals transmitted using a set of transmit beams that can be used for the full-duplex operation.

In an eighth aspect, alone or in combination with one or more of the first through seventh aspects, all subsets of beams of the set of transmit beams are suitable for full-duplex communication by the base station.

In a ninth aspect, alone or in combination with one or more of the first through eighth aspects, the information indicating whether the reference signal is associated with the full-duplex operation is indicated in a reference signal configuration for the set of reference signals.

In a tenth aspect, alone or in combination with one or more of the first through ninth aspects, the information indicating whether the reference signal is associated with the full-duplex operation is indicated in reference signal configurations that are each specific to a respective reference signal of the set of reference signals.

In an eleventh aspect, alone or in combination with one or more of the first through tenth aspects, the information indicating whether the reference signal is associated with the full-duplex operation indicates a set of reference signals transmitted using a set of transmit beams that cannot be used jointly for the full-duplex operation.

In a twelfth aspect, alone or in combination with one or more of the first through eleventh aspects, the set of transmit beams are all associated with a same transmit-receive point or a same antenna panel.

In a thirteenth aspect, alone or in combination with one or more of the first through twelfth aspects, process 900 includes transmitting information indicating a set of reference signal identifiers for a set of reference signals transmitted using a second set of transmit beams, wherein a beam from the first set of transmit beams and a beam from the second set of transmit beams can be used jointly for the full-duplex operation.

In a fourteenth aspect, alone or in combination with one or more of the first through thirteenth aspects, the information indicating whether the reference signal is associated with the full-duplex operation is indicated in a reference signal configuration for the set of reference signals.

In a fifteenth aspect, alone or in combination with one or more of the first through fourteenth aspects, the information indicating whether the reference signal is associated with the full-duplex operation is indicated in reference signal configurations that are specific to respective reference signals of the set of reference signals.

In a sixteenth aspect, alone or in combination with one or more of the first through fifteenth aspects, the information indicating whether the reference signal is associated with the full-duplex operation indicates whether a beam corresponding to the reference signal is associated with a transmit-only condition, a receive-only condition, or a transmit/receive condition.

In a seventeenth aspect, alone or in combination with one or more of the first through sixteenth aspects, the feedback indicates whether a receive beam corresponding to the reference signal is associated with a transmit-only condition, a receive-only condition, or a transmit/receive condition.

In an eighteenth aspect, alone or in combination with one or more of the first through seventeenth aspects, the feedback indicates whether a receive beam corresponding to the reference signal is associated with a transmit/receive condition.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: receiving information indicating whether a reference signal is associated with a full-duplex operation; receiving the reference signal; and transmitting feedback based at least in part on the reference signal and the information indicating whether the reference signal is associated with the full-duplex operation.

Aspect 2: The method of Aspect 1, wherein the reference signal is transmitted on a beam, and wherein the information indicating whether the reference signal is associated with the full-duplex operation indicates whether the beam is associated with the full-duplex operation.

Aspect 3: The method of any of Aspects 1-2, wherein the reference signal is at least one of a channel state information reference signal, a synchronization signal block, or a positioning reference signal.

Aspect 4: The method of any of Aspects 1-3, wherein the information indicating whether the reference signal is associated with the full-duplex operation indicates that the reference signal is for full-duplex beam selection.

Aspect 5: The method of Aspect 4, further comprising: receiving a set of reference signals on a respective set of beams; determining that the set of beams are suitable for full-duplex communication by the UE; and transmitting information indicating a set of reference signal identifiers corresponding to the set of reference signals based at least in part on the set of beams being suitable for full-duplex communication by the UE.

Aspect 6: The method of Aspect 5, wherein all subsets of beams of the set of beams are suitable for full-duplex communication by the UE.

Aspect 7: The method of any of Aspects 1-6, wherein the information indicating whether the reference signal is associated with the full-duplex operation is indicated in a reference signal configuration for the reference signal.

Aspect 8: The method of any of Aspects 1-7, wherein the information indicating whether the reference signal is associated with the full-duplex operation indicates a set of reference signals transmitted using a set of transmit beams that can be used for the full-duplex operation.

Aspect 9: The method of Aspect 8, wherein all subsets of beams of the set of transmit beams are suitable for full-duplex communication by a base station that transmits the set of reference signals.

Aspect 10: The method of Aspect 8, wherein the information indicating whether the reference signal is associated with the full-duplex operation is indicated in a reference signal configuration for the set of reference signals.

Aspect 11: The method of Aspect 8, wherein the information indicating whether the reference signal is associated with the full-duplex operation is indicated in reference signal configurations that are each specific to a respective reference signal of the set of reference signals.

Aspect 12: The method of any of Aspects 1-11, wherein the information indicating whether the reference signal is associated with the full-duplex operation indicates a set of reference signals transmitted using a set of transmit beams that cannot be used jointly for the full-duplex operation.

Aspect 13: The method of Aspect 12, wherein the set of transmit beams are all associated with a same transmit-receive point or a same antenna panel.

Aspect 14: The method of Aspect 12, wherein the set of transmit beams is a first set of transmit beams, and wherein the method further comprises: receiving information indicating a set of reference signal identifiers associated with a set of reference signals transmitted using a second set of transmit beams, wherein a beam from the first set of transmit beams and a beam from the second set of transmit beams can be used jointly for the full-duplex operation.

Aspect 15: The method of Aspect 12, wherein the information indicating whether the reference signal is associated with the full-duplex operation is indicated in a reference signal configuration for the set of reference signals.

Aspect 16: The method of Aspect 12, wherein the information indicating whether the reference signal is associated with the full-duplex operation is indicated in reference signal configurations that are specific to respective reference signals of the set of reference signals.

Aspect 17: The method of any of Aspects 1-16, wherein the information indicating whether the reference signal is associated with the full-duplex operation indicates whether a beam corresponding to the reference signal is associated with a transmit-only condition, a receive-only condition, or a transmit/receive condition.

Aspect 18: The method of Aspect 17, wherein the reference signal is associated with the transmit-only condition, and wherein the method further comprises: selecting another beam, associated with a receive-only condition or a transmit/receive condition, for the full-duplex operation.

Aspect 19: The method of Aspect 17, wherein the reference signal is associated with the receive-only condition, and wherein the method further comprises: selecting another beam, associated with a transmit-only condition or a transmit/receive condition, for the full-duplex operation.

Aspect 20: The method of Aspect 17, wherein the reference signal is associated with the transmit/receive condition, and wherein the method further comprises: selecting another beam, associated with a transmit-only condition, a receive-only condition, or a transmit/receive condition, for the full-duplex operation.

Aspect 21: The method of any of Aspects 1-20, further comprising: determining whether a receive beam corresponding to the reference signal is associated with a transmit-only condition, a receive-only condition, or a transmit/receive condition, wherein the feedback indicates whether the receive beam is associated with the transmit-only condition, the receive-only condition, or the transmit/receive condition, and wherein the feedback is based at least in part on the determination.

Aspect 22: The method of any of Aspects 1-21, further comprising: determining whether a receive beam corresponding to the reference signal is associated with a transmit/receive condition, wherein the feedback indicates whether the receive beam is associated with the transmit/receive condition.

Aspect 23: A method of wireless communication performed by a base station, comprising: transmitting information indicating whether a reference signal is associated with a full-duplex operation; transmitting the reference signal; and receiving, from a user equipment (UE), feedback based at least in part on the reference signal and the information indicating whether the reference signal is associated with the full-duplex operation.

Aspect 24: The method of Aspect 23, wherein the reference signal is transmitted on a beam, and wherein the information indicating whether the reference signal is associated with the full-duplex operation indicates whether the beam is associated with the full-duplex operation.

Aspect 25: The method of any of Aspects 23-24, wherein the reference signal is at least one of a channel state information reference signal, a synchronization signal block, or a positioning reference signal.

Aspect 26: The method of any of Aspects 23-25, wherein the information indicating whether the reference signal is associated with the full-duplex operation indicates that the reference signal is for full-duplex beam selection.

Aspect 27: The method of Aspect 26, further comprising: transmitting a set of reference signals on a respective set of beams; and receiving information indicating a set of reference signal identifiers corresponding to the set of reference signals based at least in part on the set of beams being suitable for full-duplex communication by the UE.

Aspect 28: The method of Aspect 27, wherein all subsets of beams of the set of beams are suitable for full-duplex communication by the UE.

Aspect 29: The method of any of Aspects 23-28, wherein the information indicating whether the reference signal is associated with the full-duplex operation is indicated in a reference signal configuration for the reference signal.

Aspect 30: The method of any of Aspects 23-29, wherein the information indicating whether the reference signal is associated with the full-duplex operation indicates a set of reference signals transmitted using a set of transmit beams that can be used for the full-duplex operation.

Aspect 31: The method of Aspect 30, wherein all subsets of beams of the set of transmit beams are suitable for full-duplex communication by the base station.

Aspect 32: The method of Aspect 30, wherein the information indicating whether the reference signal is associated with the full-duplex operation is indicated in a reference signal configuration for the set of reference signals.

Aspect 33: The method of Aspect 30, wherein the information indicating whether the reference signal is associated with the full-duplex operation is indicated in reference signal configurations that are each specific to a respective reference signal of the set of reference signals.

Aspect 34: The method of Aspect 23-33, wherein the information indicating whether the reference signal is associated with the full-duplex operation indicates a set of reference signals transmitted using a set of transmit beams that cannot be used jointly for the full-duplex operation.

Aspect 35: The method of Aspect 34, wherein the set of transmit beams are all associated with a same transmit-receive point or a same antenna panel.

Aspect 36: The method of Aspect 34, wherein the set of transmit beams is a first set of transmit beams, and wherein the method further comprises: transmitting information indicating a set of reference signal identifiers for a set of reference signals transmitted using a second set of transmit beams, wherein a beam from the first set of transmit beams and a beam from the second set of transmit beams can be used jointly for the full-duplex operation.

Aspect 37: The method of Aspect 34, wherein the information indicating whether the reference signal is associated with the full-duplex operation is indicated in a reference signal configuration for the set of reference signals.

Aspect 38: The method of Aspect 34, wherein the information indicating whether the reference signal is associated with the full-duplex operation is indicated in reference signal configurations that are specific to respective reference signals of the set of reference signals.

Aspect 39: The method of any of Aspects 23-38, wherein the information indicating whether the reference signal is associated with the full-duplex operation indicates whether a beam corresponding to the reference signal is associated with a transmit-only condition, a receive-only condition, or a transmit/receive condition.

Aspect 40: The method of any of Aspects 23-39, wherein the feedback indicates whether a receive beam corresponding to the reference signal is associated with a transmit-only condition, a receive-only condition, or a transmit/receive condition.

Aspect 41: The method of any of Aspects 23-40, wherein the feedback indicates whether a receive beam corresponding to the reference signal is associated with a transmit/receive condition.

Aspect 42: An apparatus for wireless communication at a device, comprising a processor; memory coupled with the processor; and instructions stored in the memory and executable by the processor to cause the apparatus to perform the method of one or more of Aspects 1-41.

Aspect 43: A device for wireless communication, comprising a memory and one or more processors coupled to the memory, the one or more processors configured to perform the method of one or more of Aspects 1-41.

Aspect 44: An apparatus for wireless communication, comprising at least one means for performing the method of one or more of Aspects 1-41.

Aspect 45: A non-transitory computer-readable medium storing code for wireless communication, the code comprising instructions executable by a processor to perform the method of one or more of Aspects 1-41.

Aspect 46: A non-transitory computer-readable medium storing a set of instructions for wireless communication, the set of instructions comprising one or more instructions that, when executed by one or more processors of a device, cause the device to perform the method of one or more of Aspects 1-41.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      receive information indicating that a reference signal is to be used for beam selection for a full-duplex communication of an uplink transmission and a downlink transmission that at least partially overlap in time, wherein a beam of the reference signal is selectable for the full-duplex communication based at least in part on the beam being associated with a first antenna panel and one or more other beams being associated with a second antenna panel different from the first antenna panel, wherein the beam and the one or more other beams are jointly used for the full-duplex communication;
      receive the reference signal; and
      transmit feedback based at least in part on the reference signal and the information indicating the reference signal is to be used for beam selection for the full-duplex communication.

2. The apparatus of claim 1, wherein the information indicating the reference signal is to be used for beam selection for the full-duplex communication indicates whether the reference signal is on the beam that is selectable for the full-duplex communication.

3. The apparatus of claim 2, wherein the one or more processors are further configured to:
   receive a set of reference signals on a set of beams;
   determine that the set of beams are suitable for the full-duplex communication by the UE; and
   transmit information indicating a set of reference signal identifiers corresponding to the set of reference signals based at least in part on the set of beams being suitable for the full-duplex communication by the UE.

4. The apparatus of claim 3, wherein all subsets of beams of the set of beams are suitable for the full-duplex communication by the UE.

5. The apparatus of claim 1, wherein the information indicating the reference signal is to be used for beam selection for the full-duplex communication is indicated in a reference signal configuration for the reference signal.

6. The apparatus of claim 1, wherein the information indicating the reference signal is to be used for beam selection for the full-duplex communication indicates a set of reference signals transmitted using a set of transmit beams that can be used for the full-duplex communication.

7. The apparatus of claim 6, wherein all subsets of beams of the set of transmit beams are suitable for the full-duplex communication by a base station that transmits the set of reference signals.

8. The apparatus of claim 1, wherein the information indicating the reference signal is to be used for beam selection for the full-duplex communication indicates a set of reference signals transmitted using a set of transmit beams that cannot be used jointly for the full-duplex communication.

9. The apparatus of claim 8, wherein the set of transmit beams are all associated with a same transmit-receive point or a same antenna panel.

10. The apparatus of claim 8, wherein the set of transmit beams is a first set of transmit beams, and wherein the one or more processors are configured to:
receive information indicating a set of reference signal identifiers associated with a set of reference signals transmitted using a second set of transmit beams, wherein a beam from the first set of transmit beams and a beam from the second set of transmit beams can be used jointly for the full-duplex communication.

11. The apparatus of claim 1, wherein the information indicating the reference signal is to be used for beam selection for the full-duplex communication indicates whether a beam corresponding to the reference signal is associated with a transmit-only condition, a receive-only condition, or a transmit and receive condition.

12. The apparatus of claim 11, wherein the reference signal is associated with the transmit-only condition, and wherein the one or more processors are configured to:
select another beam, associated with the receive-only condition or the transmit and receive condition, for the full-duplex communication.

13. The apparatus of claim 11, wherein the reference signal is associated with the receive-only condition, and wherein the one or more processors are configured to:
select another beam, associated with the transmit-only condition or the transmit and receive condition, for the full-duplex communication.

14. The apparatus of claim 11, wherein the reference signal is associated with the transmit and receive condition, and wherein the one or more processors are configured to:
select another beam, associated with the transmit-only condition, the receive-only condition, or the transmit and receive condition, for the full-duplex communication.

15. The apparatus of claim 1, wherein the one or more processors are further configured to:
determine whether a receive beam corresponding to the reference signal is associated with a transmit-only condition, a receive-only condition, or a transmit and receive condition, wherein the feedback indicates whether the receive beam is associated with the transmit-only condition, the receive-only condition, or the transmit and receive condition, and wherein the feedback is based at least in part on the determination.

16. The apparatus of claim 1, wherein the one or more processors are further configured to:
determine whether a receive beam corresponding to the reference signal is associated with a transmit and receive condition, wherein the feedback indicates whether the receive beam is associated with the transmit and receive condition.

17. An apparatus for wireless communication at a base station, comprising:
a memory; and
one or more processors, coupled to the memory, configured to:
transmit information indicating that a reference signal is to be used for beam selection for a full-duplex communication of an uplink transmission and a downlink transmission that at least partially overlap in time, wherein a beam of the reference signal is selectable for the full-duplex communication based at least in part on the beam being associated with a first antenna panel and one or more other beams being associated with a second antenna panel different from the first antenna panel, wherein the beam and the one or more other beams are jointly used for the full-duplex communication;
transmit the reference signal; and
receive, from a user equipment (UE), feedback based at least in part on the reference signal and the information indicating the reference signal is to be used for beam selection for the full-duplex communication.

18. The apparatus of claim 17, wherein the information indicating the reference signal is to be used for beam selection for the full-duplex communication indicates whether the reference signal is on the beam that is selectable for the full-duplex communication.

19. The apparatus of claim 17, wherein the information indicating the reference signal is to be used for beam selection for the full-duplex communication is indicated in a reference signal configuration for the reference signal.

20. The apparatus of claim 17, wherein the information indicating the reference signal is to be used for beam selection for the full-duplex communication indicates a set of reference signals transmitted using a set of transmit beams that can be used for the full-duplex communication.

21. The apparatus of claim 17, wherein the information indicating the reference signal is to be used for beam selection for the full-duplex communication indicates a set of reference signals transmitted using a set of transmit beams that cannot be used jointly for the full-duplex communication.

22. The apparatus of claim 17, wherein the information indicating the reference signal is to be used for beam selection for the full-duplex communication indicates whether a beam corresponding to the reference signal is associated with a transmit-only condition, a receive-only condition, or a transmit and receive condition.

23. The apparatus of claim 17, wherein the feedback indicates whether a receive beam corresponding to the reference signal is associated with a transmit-only condition, a receive-only condition, or a transmit and receive condition.

24. The apparatus of claim 17, wherein the feedback indicates whether a receive beam corresponding to the reference signal is associated with a transmit and receive condition.

25. A method of wireless communication performed by a user equipment (UE), comprising:
receiving information indicating that a reference signal is to be used for beam selection for a full-duplex communication of an uplink transmission and a downlink transmission that at least partially overlap in time, wherein a beam of the reference signal is selectable for the full-duplex communication based at least in part on the beam being associated with a first antenna panel and one or more other beams being associated with a second antenna panel different from the first antenna panel, wherein the beam and the one or more other beams are jointly used for the full-duplex communication;

receiving the reference signal; and transmitting feedback based at least in part on the reference signal and the information indicating the reference signal is to be used for beam selection for the full-duplex communication.

26. A method of wireless communication performed by a base station, comprising:

transmitting information indicating that a reference signal is to be used for beam selection for a full-duplex communication of an uplink transmission and a downlink transmission that at least partially overlap in time, wherein a beam of the reference signal is selectable for the full-duplex communication based at least in part on the beam being associated with a first antenna panel and one or more other beams being associated with a second antenna panel different from the first antenna panel, wherein the beam and the one or more other beams are jointly used for the full-duplex communication;

transmitting the reference signal; and receiving, from a user equipment (UE), feedback based at least in part on the reference signal and the information indicating the reference signal is to be used for beam selection for the full-duplex communication.

27. The method of claim 25, wherein the information indicating the reference signal is to be used for beam selection for the full-duplex communication indicates whether the reference signal is on the beam that is selectable for the full-duplex communication.

28. The method of claim 25, wherein the information indicating the reference signal is to be used for beam selection for the full-duplex communication is indicated in a reference signal configuration for the reference signal.

29. The method of claim 26, wherein the information indicating the reference signal is to be used for beam selection for the full-duplex communication indicates whether the reference signal is on the beam that is selectable for the full-duplex communication.

30. The method of claim 26, wherein the information indicating the reference signal is to be used for beam selection for the full-duplex communication is indicated in a reference signal configuration for the reference signal.

31. The apparatus of claim 1, wherein the beam of the reference signal is selectable for the full-duplex communication based at least in part on one or more capabilities which are associated with at least one of:

a spatial diversity for the full-duplex communication, a set of beams that cannot be jointly used for the full-duplex communication, or a set of beams that can be jointly used for the full-duplex communication.

* * * * *